Dec. 2, 1941. R. R. CHAMBERLIN Re. 21,961

ELECTRICAL DISCHARGE APPARATUS

Original Filed Feb. 13, 1934 4 Sheets-Sheet 1

Inventor

Robt. R. Chamberlin

ELECTRICAL DISCHARGE APPARATUS
Original Filed Feb. 13, 1934 4 Sheets-Sheet 2
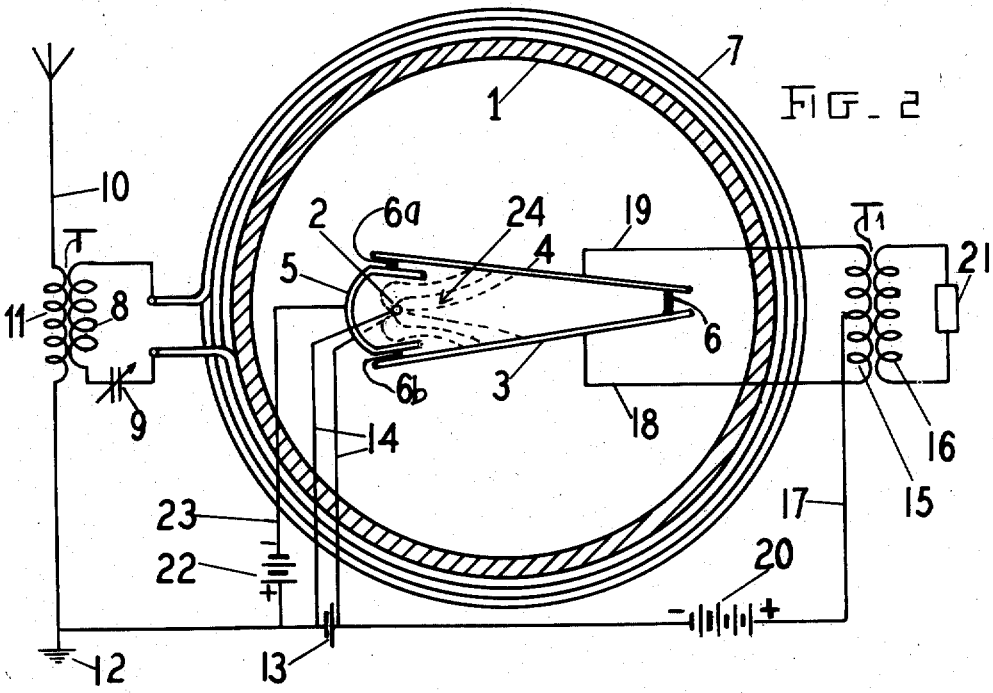
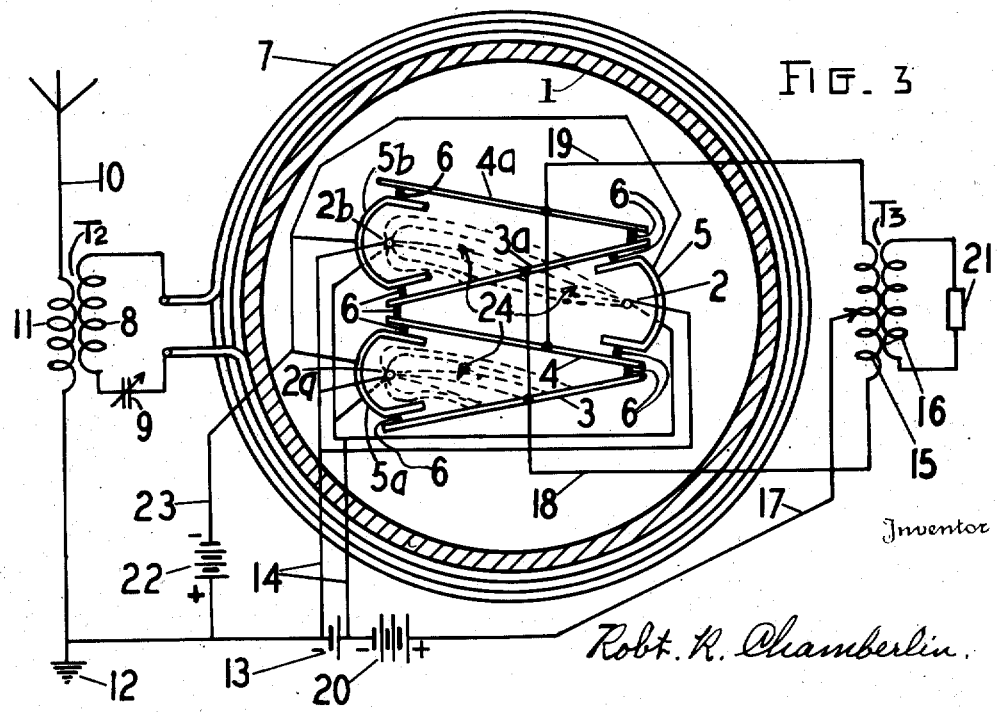

Dec. 2, 1941. R. R. CHAMBERLIN Re. 21,961

ELECTRICAL DISCHARGE APPARATUS

Original Filed Feb. 13, 1934 4 Sheets-Sheet 3

Inventor

Robt. R. Chamberlin

ELECTRICAL DISCHARGE APPARATUS

Original Filed Feb. 13, 1934 4 Sheets-Sheet 4

Inventor

Robt. R. Chamberlin.

Reissued Dec. 2, 1941 Re. 21,961

UNITED STATES PATENT OFFICE 21,961

ELECTRICAL DISCHARGE APPARATUS

Robert R. Chamberlin, Washington, D. C.

Original No. 2,118,162, dated May 24, 1938, Serial No. 711,075, February 13, 1934. Renewed September 25, 1936. Application for reissue May 23, 1940, Serial No. 336,887

45 Claims. (Cl. 250—27)

My present invention relates to improvements in the construction and operation of discharge apparatus and more particularly to devices in which the direction and flow of electrons are controlled by combined magnetic and electrostatic fields.

In carrying out the invention use is made of the principle of deflection by a magnetic field of an electron or ionized stream which may be produced in any of a number of ways. The current variations, to be reproduced or reinforced, may be impressed on a coil so situated that its magnetic field is impressed at right angles to the path of the electron stream.

The use of magnetic and electrostatic fields to control an electron discharge is known to the prior art; but by those means the control is limited and various other restrictions prevail. By my invention the arrangement and combination of elements and the method of their application, means are provided by which the limitations referred to are eliminated and an electron stream response is obtained that is sensitive to a magnetic field of low intensity.

The general object of my invention is to provide an improved apparatus of this type which is sensitive, reliable, and rapidly responsive to electric variations.

Another object of my invention is to provide an improved apparatus for securing amplified reproductions of variations of current energy.

Still another object of my invention is to produce apparatus for amplifying and detecting electric signal variations or impulses of radio telegraphy, radio telephony, or telegraphy and telephony over wires and cables.

Still another object of my invention is to provide apparatus for producing continuous oscillations.

Still another object of my invention is to provide apparatus for transmitting electric variations by radio.

A further object of my invention is to provide apparatus for impressing a plurality of different frequencies, all modulated differently, upon a single frequency.

A further object of this invention is to provide apparatus for limiting the intensity of electric variations, such as static in radio reception.

A still further object of my invention is to provide apparatus for separating each oscillation into two halves differing in phase by 180 degrees.

Other objects will be apparent, from the following description, when considered in connection with the accompanying drawings in which Figure 1 is an elevation of a simplified form of my invention having a single element. Figure 1*a* is a cross-sectional view of Figure 1 taken along the line *m*—*n*.

Figure 2 is a cross-sectional view of Figure 1 and a diagram of one circuit in which the invention is used.

Figure 3 is a form similar to that shown in Figure 2, but differing in the number of elements.

Figure 1:
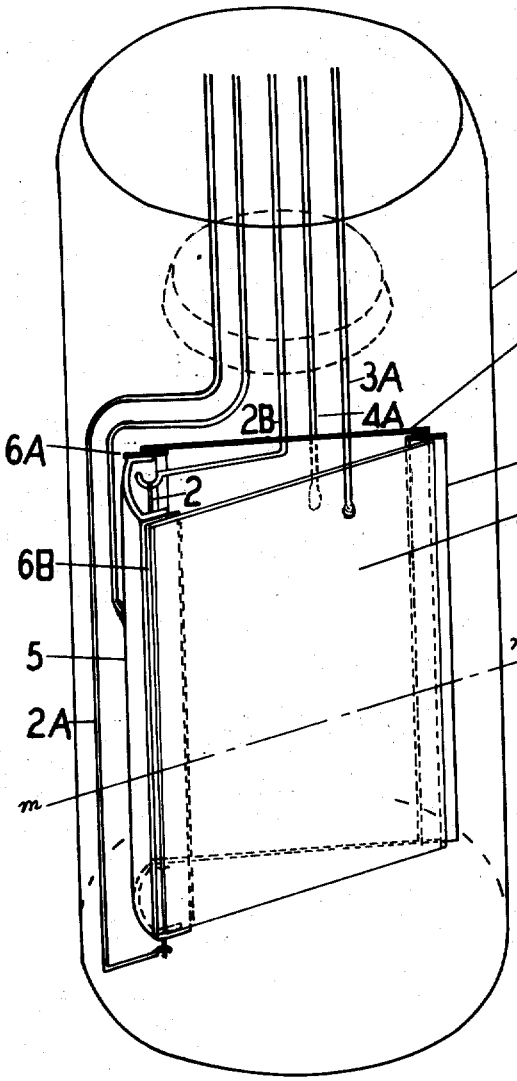
Figure 1A:
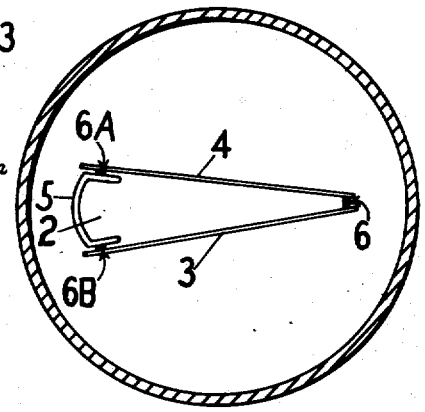

Referring to the drawings generally, but more particularly to Figure 1, reference numeral 1 indicates an exhausted container consisting of glass or other convenient material and containing filamentary cathode 2, which preferably should have considerable length, and is supported in the usual manner by the supports 2*a* and 2*b*. 3 and 4 are anodes consisting of conducting material, conveniently molybdenum or graphite, held in position by the supports 3*a* and 4*a*, and disposed at a small angle to each other so as to provide a narrow angular opening for the electronic current emanating from the cathode 2. 5 is a deflector of electrons so designed as to enclose the filament on three sides, the opening thereof facing the angular opening formed by the two anodes. The preferred arrangement of the cathode 2, with respect to the deflector 5 and the anodes 3 and 4, is shown in Figure 1*a*. The filament 2 lies parallel to the anodes 3 and 4 and at or adjacent the angular opening formed by the said anodes.

The anodes and deflectors are insulated from each other by the insulating sheets 6, 6*a*, and 6*b*, consisting of any suitable insulating material, such as mica or glass.

In Figure 2 a cross-sectional view similar to Figure 1*a* is shown surrounded by the winding 7, the terminals of said winding being joined in series with the secondary winding 8, of the transformer T and the variable condenser 9. The antenna 10 is joined, thru the primary winding 11, to a ground 12 as in the usual receiving circuit. The filamentary cathode 2 is heated in the usual manner by the battery 13 to which it is connected by the parallel leads 14, the negative terminal of the said battery being connected to the ground 12. The anodes 3 and 4 are joined to the terminals of the primary 15 of the transformer T1 by the parallel leads 18 and 19 respectively. The neutral point of the winding 15 of the transformer T1 is joined to the positive terminal of the battery 20 thru the lead 17. A detector or indicator of electric variations, 21, is connected in series with the secondary winding 16 of the transformer T1. A battery 22 has the positive terminal joined to the ground 12 and the battery 13, the negative terminal of said battery 22 being connected to the deflector 5 thru the lead 23. The broken lines 24 indicate the distribution of the electronic current when no current is flowing in coil 7.

In Figure 3 is shown a modification comprising a plurality of elements, for increasing the efficiency of the apparatus, instead of a single element as shown in Figures 1, 1a, and 2. Three filamentary cathodes 2, 2a, and 2b, and 4 anodes, 3, 3a, 4, and 4a are shown but a greater or less number may be used. Each cathode is partially enclosed by a deflector as 5, 5a, and 5b. The cathodes may be heated in any desired manner. As shown they are joined in parallel to the battery 13 by the leads 14. The anodes 3 and 3a are joined together and to one end of the primary winding 15 of the transformer T3 by the lead 18 and the anodes 4 and 4a are likewise joined together and to the other end of said winding by the lead 19.

The deflectors 5, 5a, and 5b are joined in parallel and to the negative terminal of the battery 22. The anodes are insulated from each other and from the deflectors by the insulating sheets 6.

The three filamentary cathodes 2, 2a, and 2b lie parallel to the anodes 3, 3a, 4, and 4a, and each cathode is positioned at or adjacent the opening between and at one side of a pair of anodes. In all other respects Figure 3 is similar to Figure 2.

Figure 4:
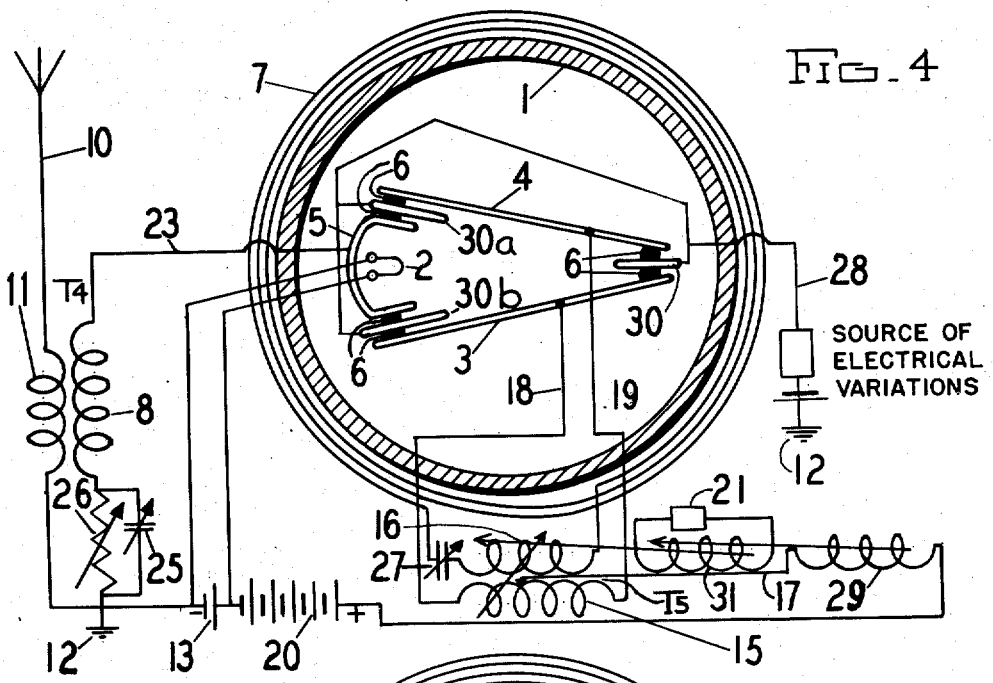
Figure 4 shows a form similar to Figures 1, 1*a*, and 2 but differing in the arrangement of the external circuit.

Figure 4 shows a modification in which one end of the secondary winding 8 of the transformer T4 is joined to the deflector 5 and the other end to the variable resistance 26 in parallel with the variable condenser 25, both of which are joined to the ground 12 and the negative terminal of the battery 13. The antenna 10 and the primary winding 11 are connected as in Figure 2. The connections of the primary winding 15 of the transformer T5 are likewise similar to the connections of the transformer T1 in Figure 2.

A further modification is shown in the connections of coil 7, said coil being connected in series with the variable condenser 27 and the winding 16 in inductive relation with the primary winding 15 of the transformer T5.

A further modification is a disposition of the conducting electrodes 30, 30a, and 30b between the insulating layers 6 and connected to the ground 12 by a conductor which may include a source of electrical variations or a battery or both such a source and a battery.

The windings 31 connected in parallel with the detector 21, is in inductive relation with the winding 16 and the winding 29 connected in series with the lead 17 joining the winding 15 to the positive terminal of the battery 20.

At least one of the conducting sheets 30, 30a, and 30b may be connected directly to ground to stabilize stray capacities or thru means interposed for impressing electrical variations. Figure 4 illustrates one possible arrangement wherein the said conducting sheets are connected to a source of electric variations and a battery in series therewith.

Figure 5:
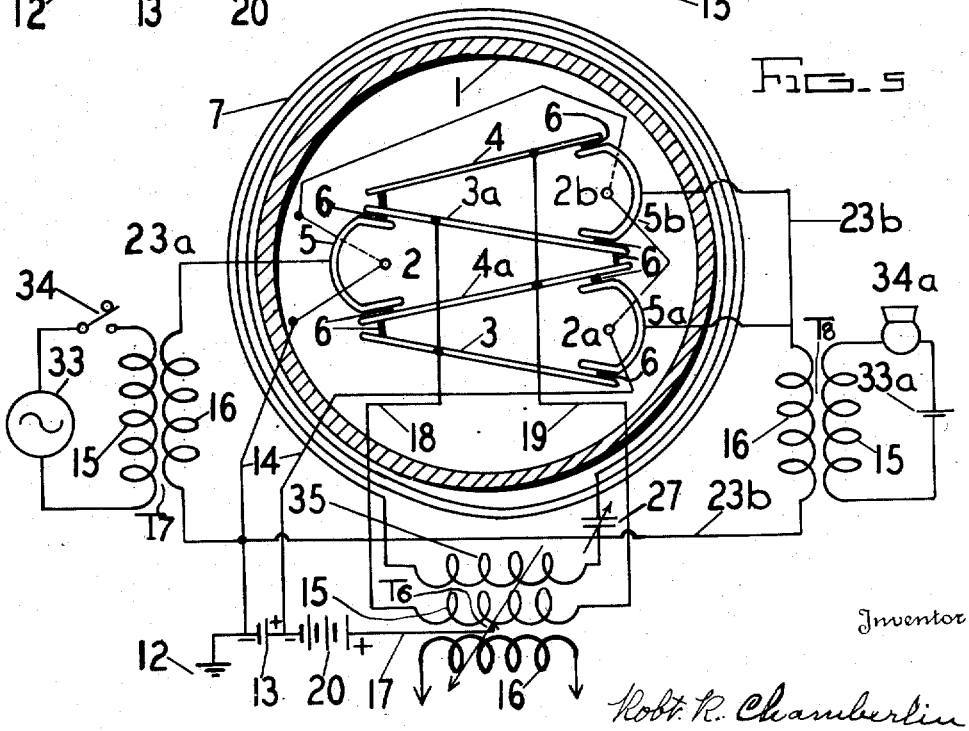
Figure 5 shows a form of similar tube construction to Figure 3 but having means attached thereto for impressing a plurality of different frequencies upon a single frequency.

In Figure 5 is shown a modification consisting of three elements wherein the filamentary cathodes 2, 2a, and 2b are joined in series and to the battery 13 by the leads 14. The anodes 3 and 3a are joined in parallel and to one end of the primary winding 15 of the transformer T6 by the lead 18. The anodes 4 and 4a are likewise joined in parallel and to the other end of the winding by the lead 19.

The coil 7 is joined in series with the variable condenser 27 and the winding 35 in inductive relation with the winding 15 of the transformer T6. The terminals of the secondary winding 16 of the transformer T6 may be utilized by transferring electrical energy to other apparatus.

The deflector 5 is connected to one end of the secondary winding 16 of the transformer T7 by the lead 23a, the other end of said winding being joined to the negative terminal of the battery 13 and the ground 12. In series with the primary winding 15, of the transformer T7, are interposed means 33 for generating alternating currents of any desired frequency and also means, such as a telegraph key 34, for varying the amplitude of the oscillations.

The deflectors 5a and 5b are connected in parallel and joined to one end of the secondary winding 16 of the transformer T8 by the lead 23b, the other end of said winding being joined to the negative terminal of the battery 13 and the ground 12. In series with the primary winding of the said transformer T8 are interposed means 33a for producing direct current and also means, such as a microphone 34a, for varying the amplitude of the said current.

While three elements are shown and two generators of alternating currents and means for modulating said oscillations in series therewith, a greater or less number of elements and generators with modulating means may be employed.

Figure 6:
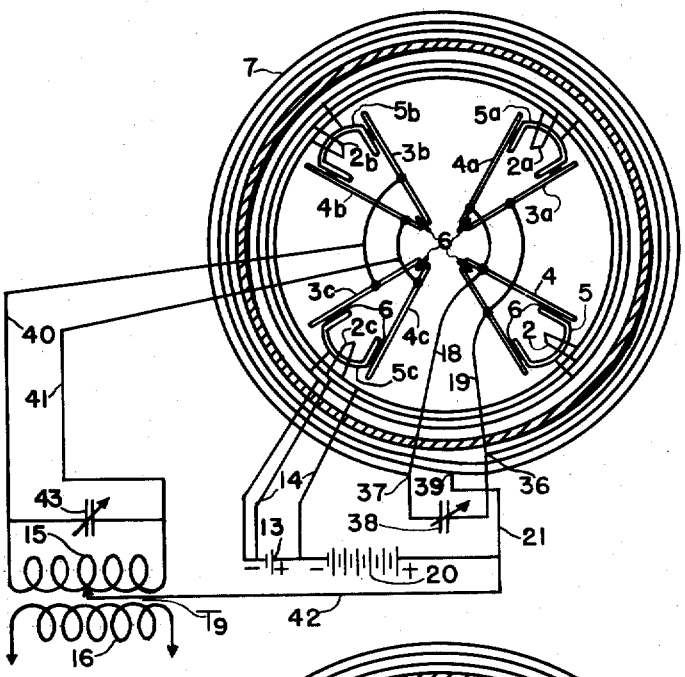
Figure 6 shows a system for producing continuous oscillations.

Another modification is illustrated in Figure 6, in which the elements are disposed in circular form. Each element is substantially arranged as shown in Figures 1, 1a and 2. The filamentary cathodes 2, 2a, 2b, and 2c may be heated in any desired manner. As shown they are joined in parallel to the battery 13 by the parallel leads 14. The anodes 3 and 3a are connected in parallel and to one end of the coil 7 by the lead 19. Likewise the anodes 4 and 4a are connected to the other end of the coil 7 by the lead 18. The numeral 38 indicates a variable condenser joined in parallel with the anodes and coil 7. The neutral point 39 of the coil 7 is joined to the positive terminal of the battery 20 by the lead 21.

The anodes 3b and 3c are joined in parallel and to one end of the primary winding 15 of the transformer T9 by the lead 40. The anodes 4b and 4c are likewise joined in parallel to one end of the said winding by the lead 41. The neutral point of the said winding is joined to the positive terminal of the battery 20 by the lead 42. A variable condenser 43 is connected in parallel with primary winding 15. The secondary winding 16 of the transformer T9 may be joined to any apparatus to which it is desired to transfer energy.

Figure 7:
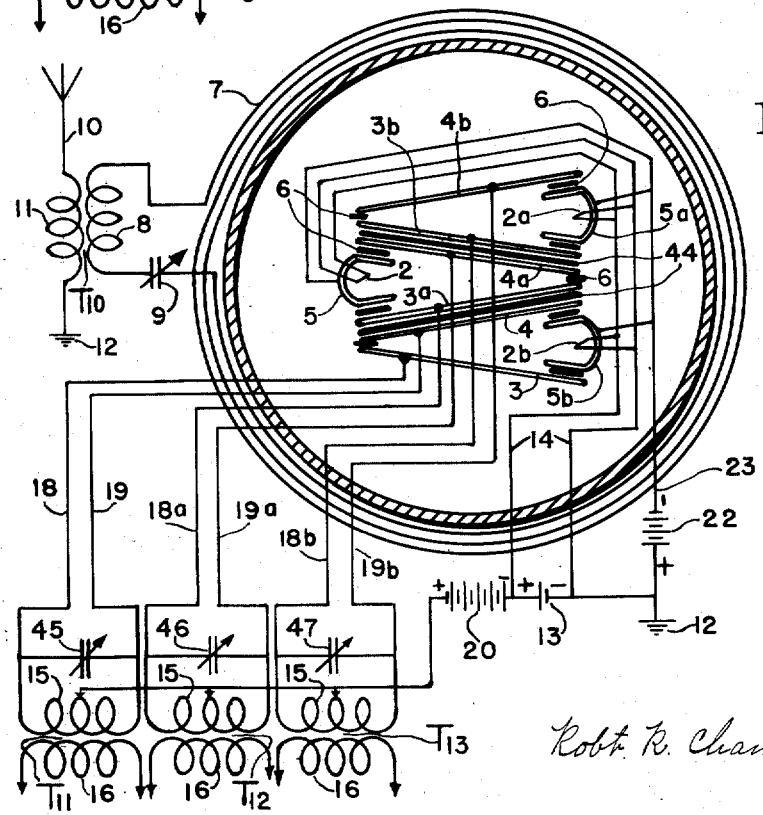
Figure 7 shows a receiving system for receiving a plurality of different frequencies impressed upon a single frequency.

While two groups of elements are shown with their anodes connected in parallel respectively and joined to the primary windings of two different transformers a greater or lesser number of groups may be used. In Figure 7 is shown a modification comprising three elements similarly arranged as shown in Figures 3 and 5, but the adjacent elements are insulated from each other by the insulating members 44, consisting of any suitable insulating material such as mica or glass. Furthermore each element has two separate anodes, there being no anode common to any two cathodes as shown in Figures 3 and 5. The filamentary cathodes 2, 2a and 2b are connected in parallel and joined to the battery 13 by the leads 14 in the usual manner. The deflectors 5, 5a and 5b are likewise joined in parallel and to the negative terminal of the battery 22 by the lead 23, the positive terminal of the said battery being joined to the negative terminal of the battery 13 and the ground 12. The anodes 3 and 4 are joined to the ends of the primary winding 15 of the transformer T11 by the leads 18 and 19, in parallel therewith being the variable condenser 45. The anodes 3a and 4a are joined to the ends of the primary winding 15 of the transformer T12 by the leads 18a and 19a and in parallel therewith is joined the variable condenser 46. The anodes 3b and 4b are likewise joined to the ends of the primary winding 15 of the transformer T13 by the leads 18b and 19b and in parallel therewith the variable condenser 47. The secondary windings 16 of the transformers T11, T12 and T13 may be connected to detecting devices or other apparatus.

The term "element" as employed in my description and claims is intended to include a filamentary cathode, the two adjacent collector plates and the deflector associated therewith. When assembled in a completed apparatus the deflector and the collector plates form closed channels, closed except at the ends where the cathode filaments enter or leave the channels. With this construction there are no gaps where electrons can escape except at the ends.

The term "source of electrical variations" as employed in my description and claims is intended to include various sources of potential and/or electric pulsations varying in their time of duration and wave form.

The term "deflector" as employed in my description and claims is intended to include a conducting element, partially surrounding the filament, the potential of which, with respect to the filament, can be so varied that the electrons impinge upon it or are deflected therefrom. If a magnetic material is used for said deflector the lines of force, comprising the magnetic field in the space immediately surrounding the cathode, will enter said deflector and thereby substantially eliminate the magnetic field in said space.

The operation of the apparatus is as follows, referring more particularly to Figures 1, 1a, and 2: when there is no current flowing in the coil 7, the electronic current from the filamentary cathode 2 is distributed as indicated by the dash lines 24. The potential of the deflector 5 being negative with respect to the cathode, due to the battery 22 interposed in the lead 23, the electrons projected from the cathode towards the said deflector are deflected from their course so that they enter the narrow converging channel formed by the anodes 3 and 4 in a narrow stream. The anodes and cathode being symmetrically disposed and the space occupied by the electrons being closed on all sides the said electrons are equally divided between the two anodes.

Since the deflection of the electronic current varies in accordance with the magnetic field established by the current in coil 7 and the velocity of the electrons emitted from the cathode for a particular electric field strength those having the slowest velocities will impinge upon an anode near the deflector, those having a greater velocity will impinge upon the anode at a correspondingly greater distance from the deflector while some of the electrons having the highest velocities will impinge upon the anode near the end of the channel opposite the cathode.

If the magnetic field is too weak to deflect the electrons having high velocities, from one anode to the other during the reversal of the field a variable current may still be obtained due to the slow moving electrons reaching the narrow end of the channel where a small deflection will reverse their flow from one anode to the other. The sensitivity of the apparatus is therefore greatly increased by disposing the narrowest part of the channel at the greatest distance from the cathode. This particular feature of the operation of the apparatus results in advantages over apparatus previously used.

Since the number of electrons in the enclosed space is limited the strength of the output signals is limited to that obtained when all the electrons are reversed from one anode to the other during the reversal of the magnetic field. Therefore, if an undesired electric disturbance, such as a strong discharge of static electricity is received by the antenna 10 and a correspondingly strong magnetic field is produced within the coil 7 the disturbance in the output circuit produced thereby cannot exceed that which is produced by a desired signal of sufficient intensity to reverse the flow of all electrons.

If it is desired to eliminate one half of an oscillation in the output circuit of the tube 1 the variable contact of the wire 17, Figures 2 and 3, may be moved toward either the lead 18 or 19 of the transformer primary 15.

The operation of the structure shown in Figure 3 is similar to that shown in Figure 2. When the current in the coil 7 is in a clockwise direction the electronic currents from the cathode 2 and 2b are deflected towards the anode 3a and the current from the cathode 2a is deflected toward the anode 3, as indicated by the broken line 24, thereby, increasing the current in the lead 18 and decreasing the current in the lead 19 correspondingly.

When the current in coil 7 is in the counterclockwise direction the electronic currents from the cathodes 2 and 2a are deflected toward the anode 4 and the current from the cathode 2b is deflected toward the anode 4a thereby increasing the current in the lead 19 and decreasing it correspondingly in the lead 18. The variations in the current in the coil 7 will therefore, produce corresponding variations in, but amplified, in the primary winding 15 of the transformer T3 and are made manifest by means connected in series with the secondary winding 16 in the usual manner.

The lead 17 shown in Figures 2 and 3 connected to the inductance 15 is variable and may of course be moved toward either end of this inductance until in or substantially in contact with either lead 18 or lead 19 to produce rectification by eliminating or reducing alternate half cycles of the alternating current. In the structure shown in Figure 4 oscillations induced in the secondary winding 8 of the transformer T4, in the usual manner are impressed upon the electronic current from the cathode 2 thru the medium of the deflector 5 by varying the potential thereof so that electrons are attracted towards it or deflected therefrom in accordance with the impressed electric variations. Said variations passing thru the leads 18 and 19, the primary winding 15 of the transformer T5, the lead 17, and the winding 29, coupled inductively to the winding 31, thereby induced in the said winding. The secondary winding 16 of the transformer T5 in series with the coil 7 and the variable condenser 27, is likewise in inductive relation with the winding 15 and the winding 31. If the coil 7 is wound in a suitable direction energy will be transferred from the winding 15 to the winding 16 and alternating current will be produced in the oscillating circuit 7, 16, 27. When the frequency of the oscillatory circuit is so adjusted as to differ by a small amount from the frequency of the incoming electromagnetic wave a beat note will be produced in the winding 31 and can be made manifest by inserting a suitable detector in parallel therewith.

The conductor 28 connecting the conducting sheets 30, 30*a*, and 30*b* in parallel may be connected directly to the ground for stabilizing stray capacities or thru a source of electromotive force and means interposed for impressing electric variations upon the said conducting sheets.

In Figure 5 the winding 35 in series with the coil 7 and variable condenser 27, is placed in inductive relation with the primary winding 15 of the transformer T6. If the coil 7 is wound in a suitable direction an alternating current is produced, its frequency being determined by the natural period of the oscillatory circuit 7, 27, 35. By means of the secondary winding 16 of the transformer T6 the oscillations produced therein may be transferred to other apparatus.

Signals, such as are used in radio telegraphy or modulations of the voice, may be impressed upon said oscillations thru the medium of the oscillations generated by 33 and 33*a* and modulated by 34 and 34*a*, respectively. For example, the oscillations generated by 33 are impressed upon the deflector 5 thru the medium of the transformer T7 producing thereby corresponding variations in the potential difference between the said deflector and filamentary cathode 2 resulting in corresponding variations in the electronic current from the cathode 2.

Since the amplitude of the oscillations in the circuit 7, 27, 35 are proportional to the electronic current from the cathodes variations in the electronic current from one or more cathodes, will produce corresponding variations in the oscillations transferred to the secondary winding 16 of the transformer T6. Simultaneously or alternately there may be impressed other modulations such as voice modulations by varying the amplitude of the direct current produced by the generator 33*a* by means of the microphone 34*a* connected in series therewith, said modulated oscillations being then impressed upon the electronic current from the cathodes 2*a* and 2*b* thru the medium of the transformer T8, the lead 23*b* and the deflectors 5*a* and 5*b*.

While only three discharge elements are shown and means for impressing one frequency modulated with telegraph signals, and another frequency modulated by speech or music, simultaneously or alternately on the frequency of the oscillating circuit 7, 27, 35, it is understood that a greater or smaller number of discharge elements and means for impressing a greater or smaller number of modulated frequencies upon the said carrier frequency may be used.

In the structure shown in Figure 6, the electronic current from each cathode is equally divided between the two anodes associated therewith when there is no current flowing in the coil 7, or when the electronic current from the anodes 3 and 3*a* flowing in a counterclockwise direction, thru the winding 36—39 which comprises one half of the coil 7, is equal to the electronic current from the anodes 4 and 4*a* and flowing in a clockwise direction thru the winding 37—39 which comprises the other half of the coil 7. If due to some irregularity, the current in one-half becomes greater or less than the current in the other half and the coil 7 is wound in a suitable manner continuous oscillations are produced. Their frequency is determined by the coil 7, the condenser 38 and other capacities in parallel therewith.

The magnetic field due to said oscillations will likewise deflect the electronic current from the cathode 2*b* and 2*c* toward one or the other of their respective anodes, thereby producing oscillations of like frequency in the circuit attached thereto, consisting of the leads 40 and 41, the variable condenser 43 and the winding 15 in parallel therewith. The oscillations produced therein may be transferred to other apparatus thru the medium of the transformer T9.

The operation of the structure shown in Figure 7 may be explained by assuming that an electromagnetic wave, whose natural period is that of the oscillatory circuit comprising the coil 7, the variable condenser 9, and the secondary winding 8 of the transformer T10, is impressed upon the antenna 10 and that oscillations are induced thereby in the oscillatory circuit 7, 8, 9 in the usual manner. It is further assumed that the said electromagnetic wave is modulated by three different frequencies each one modulated before being impressed upon said electromagnetic wave by means such as were described in connection with Figure 5. The magnetic field produced thereby in the coil 7 will produce corresponding variations in the electronic currents from the cathodes 2, 2*a* and 2*b*. If one of the three oscillatory circuits, comprising the primary of one of the transformers T11, T12 and T13 and the variable condenser in parallel therewith, is in resonance with the variations produced by one of the said modulated frequencies in the electron streams in the said channels, the modulations impressed thereupon can be made manifest by interposing means therefor in series with the winding 16 in inductive relation with the said resonant circuit. In like manner other modulating frequencies impressed upon the said carrier wave can be made manifest in the other said resonant circuits.

While this invention is disclosed in several different embodiments which are deemed desirable, it is to be understood that it is capable of embodiment in other modified forms and in different organizations without departing from the spirit of the invention and the scope of the appended claims.

What I claim as new and desire to secure by Letters Patent of the United States, is:

1. Electron discharge apparatus comprising an evacuated vessel containing a cathode having a linear extension, means for heating said cathode, a pair of anode plates disposed so as to form a narrow channel, a coil of wire surrounding said anode plates, adapted for carrying an electric current and so located as to impress a magnetic field upon an electron stream emanating from said cathode for controlling said stream, a deflector of electrons partially surrounding said cathode and positioned at one end of said channel, insulating means between said deflector and the adjacent edges of said anode plates closing said end of the channel, insulating means between said anode plates at the opposite end of said channel closing said end and conducting means joining said members to external means.

2. An electron discharge device including a pair of anode plates disposed in spaced relation with respect to each other to form the major portions of two sides of a substantially triangular prism, a shield member having a slight curvature, said member forming the other side of said prism, insulating means positioned between adjacent edges of said shield member and said anode plates, a cathode positioned between said anode plates adjacent to said shield member, means for establishing a thermionic current within said prism, and a coil of wire encircling said anode plates for controlling the flow of electrons from said cathode between said anode plates.

3. Electron discharge apparatus comprising an evacuated vessel a plurality of cathodes in said vessel, a coil surrounding said cathodes adapted to set up a magnetic field within said vessel, a plurality of deflectors, each partially surrounding one of said cathodes, a plurality of positively charged anode plates, said plates forming in conjunction with said deflectors a plurality of closed tapering channels, each of said channels having a cathode passing therethru.

4. Apparatus as in claim 3 wherein the outer one of said plurality of plates each form a wall of one channel and the intermediate plates each form a wall of two adjacent channels.

5. Apparatus as in claim 3 with conductors connecting alternate ones of the positively charged anode plates in parallel forming two sets of connected anode plates, means for balancing the current from the two sets of plates, means for connecting the two sets of plates to said balancing means and means for detecting variations in the potential of said anode plates.

6. Apparatus as in claim 3 wherein the deflectors are joined together and to the cathodes with means interposed for varying the potential difference between said deflectors and their respective cathodes, and means for connecting said cathodes to a source of electrical energy.

7. Electron discharge apparatus comprising an evacuated vessel, a plurality of cathodes in said vessel, a plurality of deflectors, each partially surrounding one of said cathodes, a plurality of anode plates, conductors connecting alternate ones of said anode plates in parallel forming two sets of connected plates, means for insulating said deflectors and plates from each other and forming in conjunction therewith a plurality of closed tapering channels each of said channels having a cathode passing therethru, detecting means, means for bypassing variable amounts of current from one of said sets of plates around said detecting means and means for connecting the two sets of plates to said bypassing means.

8. Electron discharge apparatus comprising an evacuated vessel, containing a cathode having a linear extension, a pair of conducting plates disposed so as to form a narrow channel for the stream of electrons emanating from said cathode, a coil surrounding said conducting plates, a deflector of electrons partially surrounding said cathode and positioned at one end of said channel, electrodes interposed between the deflector and the adjacent conducting plates, insulating means positioned therebetween insulating said members from each other and closing said end of the channel, an electrode positioned between the conducting plates at the opposite end of the channel and insulated therefrom closing said end of the channel and conducting means for connecting said electrodes to external means.

9. Apparatus as in claim 8 including a conductor joining said deflector and said cathode wherein means are interposed for impressing electrical variations upon the electronic current by varying the potential difference between said deflector and cathode.

10. Apparatus as in claim 8 with an electrical conductor joining said conducting electrodes thru the walls of said vessel to external means for regulating the potential of said conducting electrodes and means in series therewith for impressing electric variations upon said electrodes.

11. Apparatus as in claim 8 wherein means are provided for connecting the two electrically separated conducting plates thru the wall of said vessel to a source of electrical potential for producing positive charges on said conducting plates and a winding in series therewith for transferring electrical energy to adjacent windings by induction.

12. Apparatus as in claim 8 including an oscillatory circuit coupled to said coil and an auxiliary circuit coupled to said oscillatory circuit for producing sustained oscillations in the oscillatory circuit.

13. Apparatus as in claim 8 including an oscillatory circuit coupled to said coil and an auxiliary circuit coupled to said oscillatory circuit and means for varying the amount of current from one anode passing thru said auxiliary circuit.

14. An electron discharge device including a pair of elongated anode plates positioned side by side and gradually converging toward each other, insulating means maintaining said plates in spaced relation with respect to each other, a cathode positioned between said anode plates and parallel to a pair of longitudinal edges of said plates, electrodes between said anode plates and said cathode and extending into said space between said anode plates, means for establishing a thermionic current between said cathode and said anode plates, means for impressing variable electromotive forces upon said electrodes and detecting means coupled to said anode plates.

15. An electron tube, comprising a pair of conducting plates disposed so as to form a channel, a cathode positioned at one end of said channel, adapted to be heated to emit an electronic current, a deflecting electrode partially surrounding said cathode, insulating means positioned between said deflecting cathode and said conducting plates closing said end of channel, another electrode positioned at the opposite end of said channel and extending into said channel, insulating means positioned between the last mentioned electrode and the adjacent edges of said conducting plates closing said end of channel, a conductor connected to said cathode, a conductor connected to each electrode and to each conducting plate, each of said conductors passing thru the wall of said tube.

16. An electron tube comprising a pair of conducting plates disposed so as to form a channel, a cathode positioned at one end of said channel, adapted to be heated to emit an electronic current, a deflecting electrode partially surrounding said cathode, electrodes positioned between said deflecting electrode and each of said conducting plates and extending into said channel, insulating means positioned therebetween insulating said members from each other, additional insulating means positioned between said conducting plates at the opposite end of said channel closing said opposite end of channel, a conductor connected to said cathode, a conductor connected to each electrode and each conducting plate, each of said conductors passing thru the wall of said vessel.

17. An electron tube, comprising a pair of conducting plates disposed so as to form a channel, a cathode positioned within said channel, adapted to be heated to emit an electron stream, a deflecting and modulating electrode partially surrounding said cathode, electrodes positioned between said electrode and each of said conducting plates and extending into said channel, insulating means positioned therebetween insulating said members from each other and closing said end of channel, an additional electrode positioned between said conducting plates at the opposite end of said channel, insulating means therebetween insulating said members from each other and substantially closing said opposite end of the channel, a conductor connected to each electrode and each conducting plate, each of said conductors passing thru the wall of said vessel.

18. An electron tube comprising a pair of elongated plate electrodes forming a channel therebetween, an additional electrode disposed between a pair of adjacent longitudinal edges of said electrodes substantially closing the opening between said plate electrodes along said edges and extending into said channel, a cathode adapted to establish an electron current within said channel, positioned between said mentioned electrodes and said cathode and a conductor connected to said cathode and to each electrode, each of said conductors passing thru the wall of said tube.

19. An electron tube as in claim 18 including an electrode partially surrounding said cathode and a conductor attached thereto and passing thru the wall of said tube.

20. In electron discharge circuit arrangements the combination of an evacuated vessel, having a plurality of electrodes forming a channel, a cathode positioned at one end of said channel, a deflector partially surrounding said cathode, insulating means positioned between said deflector and the adjacent edges of a pair of anode plates closing said end of channel, insulating means between said anode plates at the opposite end of said channel closing said end, means for establishing a thermionic current between said cathode and said anode plates, an oscillatory circuit comprising a variable condenser, a coupling coil and another coil positioned around said anode plates for controlling the flow of electrons within said channel, impedance means for coupling said anodes together and to said coupling coil, means for energizing said impedance means and for coupling said impedance means to the circuit of said cathode, means for impressing signal energy upon the said deflector and said cathode, means for varying the frequency of said oscillatory circuit and means for detecting said signal energy.

21. In electron device circuit arrangements the combination of an evacuated vessel having a plurality of electrodes including a cathode, a shield electrode positioned adjacent to said cathode, a pair of anodes, means for coupling said anodes, a source of current supply connected between said anode coupling means and said cathode, means for impressing signalling energy upon the circuit of said cathode and said shield electrode for varying the electron stream between said cathode and said anodes in accordance with said signal, a coil surrounding said electrodes, means for adjusting the frequency characteristics of said coil and means for coupling the circuit of said coil to said anode coupling means.

22. In electron discharge circuit arrangements the combination of an evacuated vessel having a plurality of electrodes including a cathode, a shield electrode and a pair of anodes, a coil surrounding said electrodes, a transformer having a plurality of windings coupled together, one of said windings being connected to said coil, another of said windings being connected to said anodes, a source of current supply connected to said last mentioned winding and to said cathode and means for impressing signaling energy upon said cathode and said shield electrode.

23. Apparatus as in claim 3 including an oscillatory circuit coupled to said coil, an auxiliary circuit coupled to said oscillatory circuit for producing sustained oscillations in the oscillatory circuit and means for transferring said oscillations to other apparatus.

24. Apparatus as in claim 3 including electrical conductors and means, in series therewith connecting said deflectors to their respective cathodes, for impressing modulated high frequencies upon the electric current emanating from said cathodes.

25. In electron discharge circuit arrangements, the combination of an evacuated vessel containing a plurality of cathodes, a plurality of deflectors each partially surrounding one of said cathodes, a plurality of anode plates, insulating means positioned between said anode plates and said deflectors, said deflectors, plates and insulating means forming a plurality of closed tapering channels, each of said channels having a cathode passing therethrough, means for establishing an electron stream in each of said channels, conductors connecting said deflectors to their respective cathodes and means in series therewith for impressing modulated high frequencies upon the electron streams emanating from said cathodes, an oscillatory circuit comprising a coil surrounding said channels, a condenser and coupling coil in series therewith, conductors connecting the alternate plates in parallel forming two sets of plates, a coil connected therebetween coupled to said coupling coil and means for transferring electric energy to other means.

26. In an alternating current generator, having in combination an evacuated vessel, a plurality of cathodes in said vessel, circularly arranged about the axis of said vessel, a coil surrounding said cathodes, a plurality of deflectors connected together, each partially surrounding one of said cathodes, a plurality of positively charged anode plates, said anode plates forming in conjunction with said deflectors a plurality of closed narrow tapering channels, each of said channels having a cathode passing therethru, the adjacent channels being insulated from each other.

27. An apparatus as in claim 26 including means for establishing electronic currents in said channels, an oscillatory circuit comprising a variable condenser and said coil so disposed as to impose a magnetic field upon the electronic currents emanating from said cathodes for controlling said currents, conducting means joining said oscillatory circuit to a plurality of alternate ones of said anode plates and a source of electrical energy joined to said coil for establishing sustained electrical oscillations in said oscillatory circuit.

28. An apparatus as in claim 26 including means for establishing electron currents in each of said channels, an oscillatory circuit comprising a variable condenser and said coil so disposed as to impose a magnetic field upon said electron currents for controlling said currents, conducting means joining said oscillatory circuit to a plurality of alternate ones of said anode plates and to a source of electrical energy for establishing sustained electrical oscillations in said oscillatory circuit, conductors connecting the remaining anode plates to external means for transferring electrical energy to other means.

29. An electron discharge device, having in combination an evacuated vessel, a plurality of cathodes in said vessel, a plurality of deflectors, each partially surrounding one of said cathodes, a plurality of anode plates, said anode plates insulated from each other and said deflectors, forming in conjunction therewith a plurality of closed channels, means for establishing thermionic currents within said channels, a coil surrounding said channels, a condenser in series therewith comprising an oscillatory circuit, said coil being connected to a source of electrical energy and a plurality of alternately connected anode plates, said coil being positioned so that the magnetic field established by the electron currents in the channels connected to said coil control the electron current in the channels connected to other means.

30. Electron discharge apparatus comprising an evacuated vessel, a plurality of cathodes in said vessel, a coil surrounding said cathodes, a plurality of deflectors, each partially surrounding one of said cathodes, a plurality of electrically separated positively charged anode plates, said deflectors forming in conjunction with said anode plates a plurality of closed narrow tapering channels each of said channels having a cathode passing therethru, and means insulating said channels from each other and conducting means for connecting the members of said channels to external means.

31. Apparatus as in claim 24 including means for establishing an electron stream in each of said tapering channels, an oscillatory circuit and means in inductive relation therewith for receiving electrical variations, a coil of said oscillatory circuit including a coil so arranged as to impose the magnetic field due to electrical variations therein, at right angles to the electronic currents from the plurality of cathodes.

32. Apparatus as in claim 24 including a plurality of pairs of electrical conductors a pair of said conductors joining each of the pairs of anode plates associated with a cathode, said conductors passing thru a wall of said vessel, an oscillatory circuit connected to each of said pairs of conductors and means in inductive relation with each of the oscillatory circuits for transferring energy to other apparatus.

33. An electron tube comprising a plurality of anode plates, positioned so as to form a plurality of tapering channels, a plurality of cathodes, each positioned at the wider end of a tapering channel and adapted to be heated to emit an electronic current, a plurality of electrodes each partially surrounding one of said cathodes, insulating means positioned between the said anode plates and electrodes forming in conjunction therewith a plurality of closed tapering channels, means insulating said channels from each other, a conductor connected to each of said cathodes, a conductor connected to each of the said anode plates and electrodes, and each of said conductors passing through the wall of said tube.

34. An electron discharge device including a pair of elongated anode plates positioned adjacent to each other and forming an elongated channel therebetween, a shield electrode positioned parallel to said anode plates in spaced relation thereto, insulating means positioned between a pair of adjacent edges of said anodes for spacing said anodes, a cathode extending parallel to and within said shield electrode and positioned to emit electrons into the space between said anode plates, means for maintaining said shield at a negative potential with respect to said cathode and a coil of wire encircling said anode plates for controlling the direction of flow of electrons emitted from said cathode.

35. An electron discharge device including a pair of elongated anode plates positioned side by side, and gradually converging toward each other, insulating spacing means positioned between the adjacent edges at the narrow end of the channel formed by the said anode plates, a cathode positioned between said plates adjacent to the wider end of said channel, a deflector of electrons partially surrounding said cathode, insulating means positioned between said deflector and said anodes thereby forming a closed tapering channel, means for establishing an electron current in said channel, a coil of wire encircling said plates, and means for impressing signal energy on said coil of wire for directing the electrons emitted by said cathode to one or both of said anodes in accordance with the magnetic field set up by the signal currents, the said anodes, cathode, and coil of wire being arranged to limit the effective intensity of undesired electrical disturbances not to exceed that of the desired signal.

36. An electron discharge device according to claim 35 including electrodes between said anode plates and said cathode and a source of electrical energy connected between said last mentioned electrodes and said cathode.

37. An electron discharge device including a pair of elongated anode plates positioned side by side, and gradually converging toward each other, insulating spacing means positioned between adjacent edges of said anode plates, a cathode positioned between said plates adjacent to the mouth of said converging plates and a coil of wire encircling said plates.

38. An electron discharge device according to claim 34 including electrodes between said anodes and said cathode and a source of electrical energy connected between these electrodes and said cathode.

39. Apparatus as in claim 3 wherein the deflectors consist of magnetic material.

40. An electron discharge device including a pair of elongated anode plates positioned adjacent to each other and forming an elongated channel therebetween, a shield electrode positioned parallel to said anode plates in spaced relation thereto, insulating means positioned between a pair of adjacent edges of said anode plates for spacing said plates, a cathode extending parallel to said shield electrode and positioned to emit electrons into the space between said anode plates, means for maintaining said shield at a negative potential with respect to said cathode and a coil of wire encircling said anode plates for setting up a magnetic field for controlling the direction of flow of electrons emitted from said cathode.

41. An electron discharge device according to claim 37 including electrodes between said anodes and said cathode and a source of electrical energy connected between these electrodes and said cathode.

42. Electron discharge apparatus including an electron discharge device having a pair of elongated anode plates, an insulation member disposed between a pair of adjacent longitudinal edges of said plates for substantially insulating said plates from each other and for substantially closing the opening between said plates along said edges, a cathode positioned between said anode plates adjacent to the other longitudinal edges thereof and a coil of wire wound around said plates for setting up a magnetic field for controlling the movement of electrons emitted from said cathode between said anode plates, means for impressing an electric current upon said coil, means for coupling said anodes to said cathode, indicating means and means for connecting said indicating means to at least one of said anodes.

43. Electron discharge apparatus including an electron discharge device having a pair of anode plates disposed in spaced relation with respect to each other to form the major portions of two sides of a substantially triangular prism, a shield member having a slight curvature, said member forming the other side of said prism, insulating means positioned between adjacent edges of said shield member and said anode plates, a cathode positioned between said anode plates adjacent to said shield member, and a coil of wire encircling said anode plates for controlling the flow of electrons from said cathode between said anode plates, means for impressing signal energy upon said coil, means for coupling said anodes to said cathode, indicating means and means for connecting said indicating means to at least one of said anodes.

44. Electron discharge apparatus including an electron discharge device having a pair of elongated anode plates positioned adjacent to each other and forming an elongated channel therebetween, a shield electrode positioned parallel to said anode plates in spaced relation thereto, insulating means positioned between a pair of adjacent edges of said anode plates for spacing said plates, a cathode extending parallel to said shield electrode and positioned to emit electrons into the space between said anode plates, means for maintaining said shield at a negative potential with respect to said cathode and a coil of wire encircling said anode plates for setting up a magnetic field for controlling the direction of flow of electrons emitted from said cathode, means for impressing electric currents upon said coil, means for coupling said anodes to said cathode, indicating means and means for connecting said indicating means to at least one of said anodes.

45. Electron discharge apparatus including an electron discharge device having a pair of elongated anodes positioned side by side and gradually converging toward each other, insulating spacing means positioned between adjacent edges of said anodes, a cathode positioned between said anodes adjacent to the mouth thereof, a coil of wire encircling said anodes, means for impressing electric currents upon said coil, means for coupling said anodes to said cathode, indicating means and means for connecting said indicating means to at least one of said anodes.

ROBERT R. CHAMBERLIN.